(12) United States Patent
Salter et al.

(10) Patent No.: US 9,434,297 B2
(45) Date of Patent: Sep. 6, 2016

(54) PHOTOLUMINESCENT VEHICLE GRAPHICS

(71) Applicant: Ford Global Technologies, LLC, Dearborn, MI (US)

(72) Inventors: Stuart C. Salter, White Lake, MI (US); James J. Surman, Clinton Township, MI (US); Cornel Lewis Gardner, Romulus, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 14/525,370

(22) Filed: Oct. 28, 2014

(65) Prior Publication Data

US 2015/0197181 A1   Jul. 16, 2015

Related U.S. Application Data

(63) Continuation-in-part of application No. 14/502,039, filed on Sep. 30, 2014, which is a continuation-in-part of application No. 14/452,893, filed on Aug. 6, 2014, which is a continuation-in-part of application No. 14/301,635, filed on Jun. 11, 2014, which is a continuation-in-part of application No. 14/156,869, filed on Jan. 16, 2014, which is a continuation-in-part of application No. 14/086,442, filed on Nov. 21, 2013.

(51) Int. Cl.

| *B60Q 1/32* | (2006.01) |
|---|---|
| *F21S 8/10* | (2006.01) |
| *G09F 13/22* | (2006.01) |
| *G09F 21/04* | (2006.01) |

(52) U.S. Cl.
CPC ............. *B60Q 1/323* (2013.01); *F21S 48/214* (2013.01); *G09F 13/22* (2013.01); *G09F 21/048* (2013.01); *B60Q 2400/20* (2013.01)

(58) Field of Classification Search
CPC ..... B60Q 1/323; G09F 21/048; G09F 13/22; F21S 48/214
See application file for complete search history.

(56) References Cited

U.S. PATENT DOCUMENTS

| 5,477,460 | A | * | 12/1995 | Vakirtzis | ............ | G06F 17/5022 716/109 |
|---|---|---|---|---|---|---|
| 5,709,453 | A | | 1/1998 | Krent et al. | | |
| 6,729,738 | B2 | | 5/2004 | Fuwausa et al. | | |
| 6,773,129 | B2 | | 8/2004 | Anderson, Jr. et al. | | |

(Continued)

FOREIGN PATENT DOCUMENTS

| CN | 201169230 Y | 12/2008 |
|---|---|---|
| CN | 101337492 A | 1/2009 |

(Continued)

*Primary Examiner* — David V Bruce

(74) *Attorney, Agent, or Firm* — Jason Rogers; Price Heneveld LLP

(57) ABSTRACT

An illumination apparatus for a vehicle is disclosed. The illumination apparatus comprises a trim portion affixed to a surface comprising a first photoluminescent portion and at least one light source. The light source may be configured to emit a first emission at a first wavelength. The first emission may be configured to excite the first photoluminescent portion in a back-lit configuration. The trim portion is configured to mask the first photoluminescent portion from external light sources to prevent excitation of the first photoluminescent portion in the presence of external light sources.

20 Claims, 12 Drawing Sheets

(56) References Cited

U.S. PATENT DOCUMENTS

| | | |
|---|---|---|
| 6,851,840 B2 | 2/2005 | Ramamurthy et al. |
| 6,871,986 B2 | 3/2005 | Yamanaka et al. |
| 6,990,922 B2 | 1/2006 | Ichikawa et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,071,988 B2 | 12/2011 | Lee et al. |
| 8,113,695 B2 | 2/2012 | Meinke et al. |
| 8,203,260 B2 | 6/2012 | Li et al. |
| 8,286,378 B2 | 10/2012 | Martin et al. |
| 8,303,147 B2 | 11/2012 | Jeon |
| 8,333,492 B2 | 12/2012 | Dingman et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,624,716 B2 | 1/2014 | Englander |
| 8,631,598 B2 | 1/2014 | Li et al. |
| 8,683,722 B1 | 4/2014 | Cowan |
| 8,724,054 B2 | 5/2014 | Jones |
| 8,773,012 B2 | 7/2014 | Ryu et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0021961 A1 | 2/2004 | Munro |
| 2004/0213088 A1 | 10/2004 | Fuwausa |
| 2006/0087826 A1 | 4/2006 | Anderson, Jr. |
| 2006/0097245 A1* | 5/2006 | Aanegola ............ H01L 25/0753 257/26 |
| 2007/0032319 A1 | 2/2007 | Tufte |
| 2007/0081320 A1* | 4/2007 | Gilbert .................. H05B 33/08 362/34 |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2011/0002138 A1 | 1/2011 | Hayes et al. |
| 2012/0001406 A1 | 1/2012 | Paxton et al. |
| 2012/0280528 A1 | 11/2012 | Dellock et al. |
| 2013/0299856 A1 | 11/2013 | Verger et al. |
| 2013/0335994 A1 | 12/2013 | Mulder et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2556996 A3 | 10/2013 |
| EP | 2778209 A1 | 9/2014 |
| JP | 2000159011 A | 6/2000 |
| JP | 2007238063 A | 9/2007 |
| WO | 9716812 A1 | 5/1997 |
| WO | 2006047306 A1 | 5/2006 |
| WO | 2014068440 A1 | 5/2014 |

* cited by examiner

PHOTOLUMINESCENT VEHICLE GRAPHICS

CROSS-REFERENCE TO RELATED APPLICATIONS

This application is a continuation-in-part of U.S. patent application No. 14/502,039, filed Sep. 30, 2014, entitled "PHOTOLUMINESCENT VEHICLE GRAPHICS," which is a continuation-in-part of U.S. patent application Ser. No. 14/452,893, filed Aug. 6, 2014, entitled "INTERIOR EXTERIOR MOVING DESIGNS," which is a continuation-in-part of U.S. patent application Ser. No. 14/301,635, filed Jun. 11, 2014, entitled "PHOTOLUMINESCENT VEHICLE READING LAMP," which is a continuation-in-part of U.S. patent application No. 14/156,869, filed Jan. 16, 2014, entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present disclosure generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, an illumination apparatus for a vehicle is disclosed. The illumination apparatus comprises a trim portion affixed to a surface comprising a first photoluminescent portion and at least one light source. The light source may be configured to emit a first emission at a first wavelength. The first emission may be configured to excite the first photoluminescent portion in a back-lit configuration. The trim portion is configured to mask the first photoluminescent portion from external light sources to prevent excitation of the first photoluminescent portion in the presence of external light sources.

According to another aspect of the present invention, a lighting system for a vehicle is disclosed. The lighting system comprises at least one light source in communication with a control circuit and a trim portion affixed to a surface. The trim portion comprises a first photoluminescent portion and a cover portion configured to house the light source. The control circuit is configured to selectively activate the light source to emit a first emission to excite the first photoluminescent portion in a back-lit configuration. The excitation of the first photoluminescent portion may illuminate the cover portion to reveal a graphic.

According to yet another aspect of the present invention, a lighting system for a vehicle is disclosed. The lighting system comprises at least one light source and a trim portion affixed to a surface. The trim portion comprises a first photoluminescent portion, a second photoluminescent portion, and a cover portion configured to house the light source. The light source is configured to selectively emit a first emission to excite at least one of the first photoluminescent portion and the second photoluminescent portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
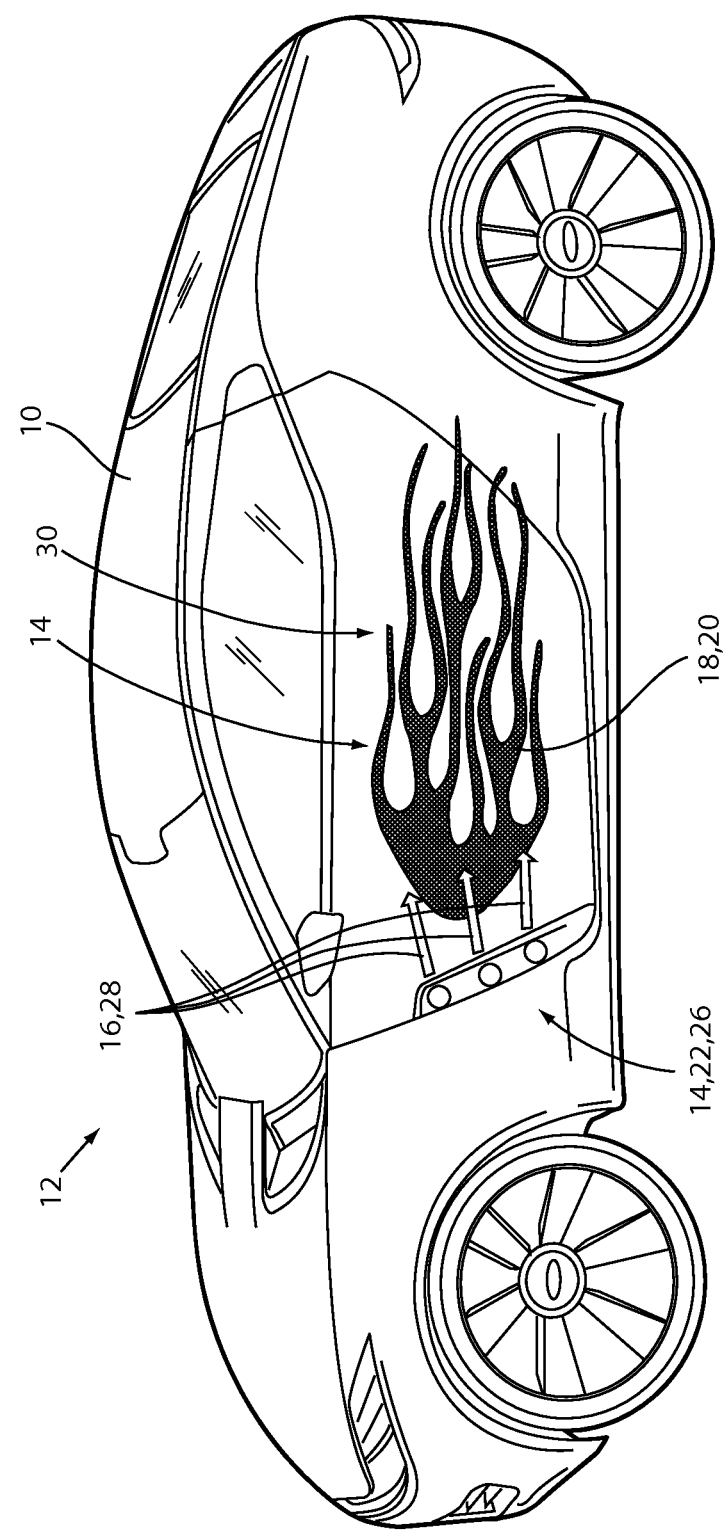
FIG. 1 is a perspective view of a vehicle comprising a lighting system configured to generate motion effect.

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms first, second, third, etc. as utilized herein may provide designations in reference to the figures for clarity. For example, a first portion and a second portion may be referred to in some embodiments and only a second portion may be referred to in some additional embodiments. Such designations may serve to demonstrate exemplary arrangements and compositions and should not be considered to designate a specific number of elements or essential components of any specific embodiment of the disclosure, unless clearly specified otherwise. These designations, therefore, should be considered to provide clarity in reference to various possible embodiments of the disclosure which may be combined in various combinations and/or individually utilized to clearly reference various elements of the disclosure.

The following disclosure describes a lighting system for a vehicle configured to illuminate a first photoluminescent portion of at least one vehicle panel having a first luminescent absorption range. The first light source is configured to emit a first emission of light having a first wavelength corresponding to the first luminescent absorption range. In response to receiving the first emission, the first photoluminescent portion is configured to emit a second emission. The second emission has a second wavelength that differs from the first wavelength in that the second wavelength is longer and more acutely visible to the human eye. In this configuration, the lighting system provides for illumination of the first photoluminescent portion from the first light source.

In some embodiments, the lighting system further includes a second light source and a second photoluminescent portion having a second luminescent absorption range. The second light source is configured to emit a third emission having a third wavelength corresponding to the second photoluminescent portion. In response to receiving the third emission, the second photoluminescent portion is configured to emit a fourth emission. The lighting system is operable to generate a perceived motion effect or animation by selectively illuminating the first light source and the second light source to generate the second and fourth emission from the first and second photoluminescent portions, respectively.

The motion effect or animation as discussed herein refers to a perceived visual effect that may result at least partially due to a persistence of motion phenomenon. For example, as the first and second light sources alternate emitting the first and third emission of light, the first and second photoluminescent portions may selectively illuminate and emit the second and fourth emissions of light. By alternating between outputting the second and fourth emissions of light, the lighting system is operable to generate a motion effect corresponding to the spatial relationship between the first and second photoluminescent portions. The motion effect may correspond to a flickering, oscillating, and/or animated sequence configured to generate a moving design and/or graphic on the vehicle.

Referring to FIG. 1, a perspective view of a vehicle 10 comprising a lighting system 12 configured to generate motion effect is shown. The lighting system 12 comprises at least one light source 14 configured to emit a first emission 16 having a first wavelength. The lighting system 12 further comprises at least one photoluminescent portion 18 configured to emit a second emission 20 having a second wavelength. The second emission 20 causes the at least one photoluminescent portion 18 to have an ambient glow having a color corresponding to one or more wavelengths corresponding to the second wavelength. The at least one photoluminescent portion 18 may comprise at least one photoluminescent structure that is excited in response to receiving the first emission 16 and converts the first wavelength to the second wavelength to illuminate the at least one photoluminescent portion 18.

The at least one photoluminescent portion 18 may correspond to a plurality of photoluminescent portions. Similarly, the at least one light source 14 may correspond to a plurality of light sources. In some embodiments, each of the plurality of light sources is configured to correspond to each of the photoluminescent portions to illuminate a corresponding photoluminescent portion. For example, a first light source 22 may correspond to a first photoluminescent portion 24. The first light source 22 may be configured to emit the first emission 16 such that the first photoluminescent portion 24 becomes excited and converts the first emission 16 to a second emission 20 having a second wavelength.

In some embodiments, a second light source 26 may be configured to emit a third emission 28 corresponding to a second photoluminescent portion 30. The second light source 26 may correspond to one of the plurality of light sources demonstrated in FIG. 1 as the at least one light source 14. The second photoluminescent portion 30 may correspond to one of the plurality of photoluminescent portions demonstrated in FIG. 1 as the at least one photoluminescent portion 18. In some embodiments, the second photoluminescent portion 30 may be configured to have a form or shape that complements the first photoluminescent portion 24, for example a shadow, accent, and/or any form configured to generate a blur or motion effect offset relative to the first photoluminescent portion 24.

To generate the motion effect or accent, the second photoluminescent portion 30 is configured to become excited and convert the third emission 28 to a fourth emission 32 having a fourth wavelength. In this way, the disclosure provides for the lighting system 12 to be operable to selectively illuminate the first photoluminescent portion 24 and the second photoluminescent portion 30 to generate a motion animation effect. The second light source 26 and the second photoluminescent portion 30 may be disposed on the vehicle 10 similar to the at least one light source 14 and the at least one photoluminescent portion 18, respectively. Further discussion of the pluralities of light sources and photoluminescent portions are discussed herein, particularly in reference to FIGS. 6A-7B.

Figure 2A:
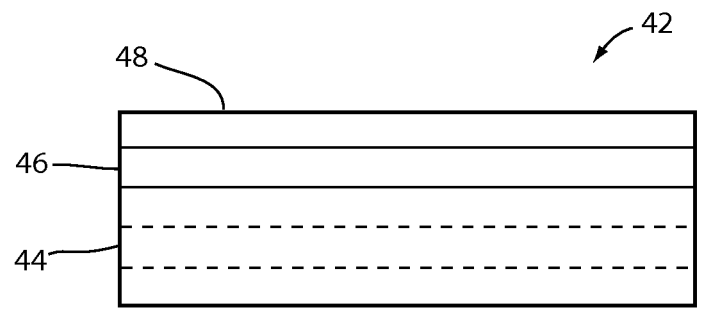
FIG. 2A illustrates a photoluminescent structure rendered as a coating.
Figure 2B:
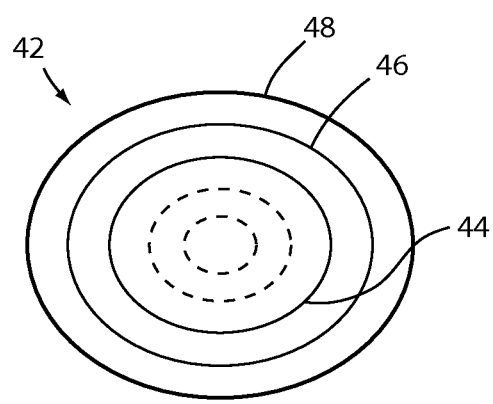
FIG. 2B illustrates a photoluminescent structure rendered as a discrete particle.
Figure 2C:
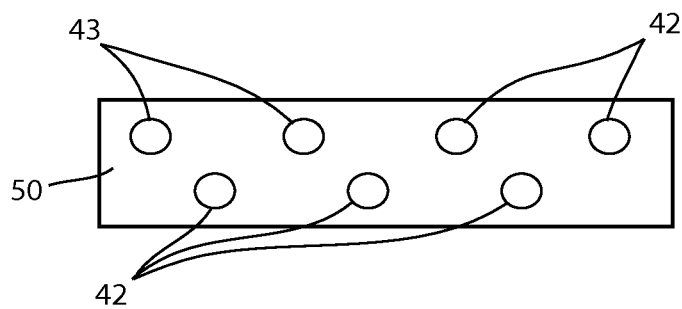
FIG. 2C illustrates a plurality of photoluminescent structures rendered as discrete particles and incorporated into a separate structure.

Referring to FIGS. 2A-2C, a photoluminescent structure 42 is generally shown rendered as a coating (e.g. a film) capable of being applied to a vehicle fixture, a discrete particle capable of being implanted in a vehicle fixture, and a plurality of discrete particles incorporated into a separate structure capable of being applied to a vehicle fixture, respectively. The photoluminescent structure 42 may correspond to the photoluminescent portions as discussed herein, for example the first photoluminescent portion 24 and the second photoluminescent portion 30. At the most basic level, the photoluminescent structure 42 includes an energy conversion layer 44 that may be provided as a single layer or a multilayer structure, as shown through broken lines in FIGS. 2A and 2B.

The energy conversion layer 44 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various embodiments discussed herein, each of the wavelengths of light (e.g. the first wavelength, etc.) correspond to electromagnetic radiation utilized in the conversion process.

Each of the photoluminescent portions may comprise at least one photoluminescent structure 42 comprising an energy conversion layer (e.g. conversion layer 44). The energy conversion layer 44 may be prepared by dispersing the photoluminescent material in a polymer matrix 50 to form a homogenous mixture using a variety of methods. Such methods may include preparing the energy conversion layer 44 from a formulation in a liquid carrier medium and coating the energy conversion layer 44 to a desired planar and/or non-planar substrate of a vehicle fixture. The energy conversion layer 44 coating may be deposited on a vehicle fixture by painting, screen printing, spraying, slot coating, dip coating, roller coating, and bar coating. Additionally, the energy conversion layer 44 may be prepared by methods that do not use a liquid carrier medium.

For example, a solid state solution (homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multilayered energy conversion layers 44 may be implanted into a vehicle fixture or panel. When the energy conversion layer 44 includes a multilayer formulation, each layer may be sequentially coated. Additionally, the layers can be separately prepared and later laminated or embossed together to form an integral layer. The layers may also be co-extruded to prepare an integrated multilayered energy conversion structure.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protective layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a chosen vehicle fixture and/or panel.

In some embodiments, the photoluminescent structure 42 may be incorporated into a vehicle fixture as one or more discrete multilayered particles as shown in FIG. 2C. The photoluminescent structure 42 may also be provided as one or more discrete multilayered particles dispersed in a polymer formulation that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
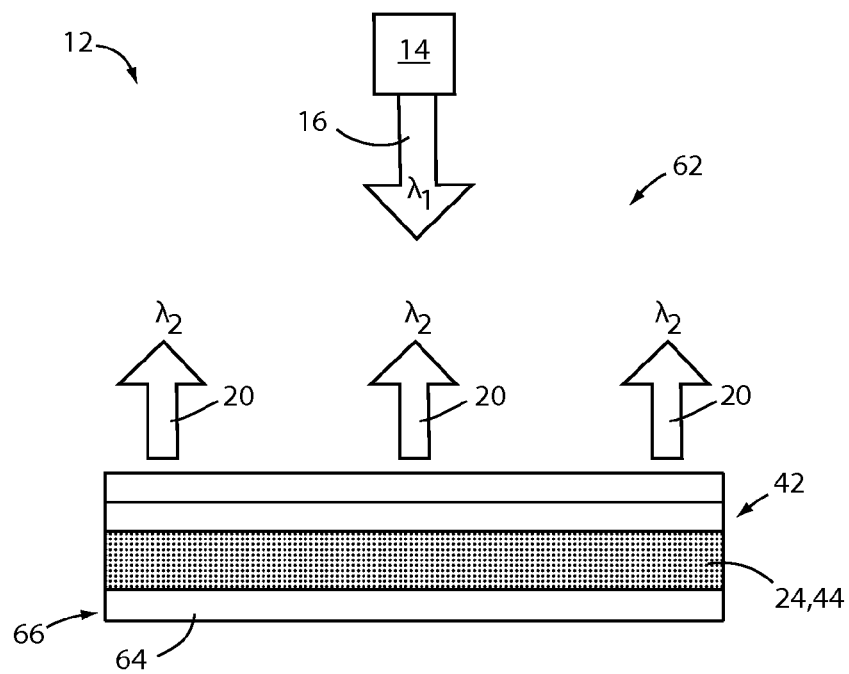
FIG. 3 illustrates a lighting system configured to convert a first emission of light to a second emission of light.

Referring to FIG. 3, the lighting system 12 is generally shown according to a front-lit configuration 62 to convert the first emission 16 from the at least one light source 14 to the second emission 20. The first emission 16 comprises a first wavelength $\lambda_1$, and the second emission 20 comprises a second wavelength $\lambda_2$. The lighting system 12 may include the photoluminescent structure 42 rendered as a coating and applied to a substrate 64 of a vehicle fixture 66. The photoluminescent structure 42 may include the energy conversion layer 44, and in some embodiments may include the stability layer 46 and/or protective layer 48. In response to the at least one light source 14 being activated, the first emission 16 is converted from the first wavelength $\lambda_1$ to the second emission 20 having at least the second wavelength $\lambda_2$. The second emission 20 may comprise a plurality of wavelengths configured to emit significantly white light from the vehicle fixture 66.

In various embodiments, the lighting system 12 comprises at least one energy conversion layer 44 configured to convert the first emission 16 at the first wavelength $\lambda_1$ to the second emission 20 having at least the second wavelength $\lambda_2$. The at least one energy conversion layer 44 may be configured to generate a variety of visible colors by utilizing at least one of a red-emitting photoluminescent material, a green-emitting photoluminescent material, and a blue-emitting photoluminescent material dispersed in the polymer matrix 50. The red, green, and blue-emitting photoluminescent materials may be combined to generate the significantly white light for the second emission 20. Further, the red, green, and blue-emitting photoluminescent materials may be utilized in a variety of proportions and combinations to control the color of the second emission 20.

Each of the photoluminescent materials may vary in output intensity, output wavelength, and peak absorption wavelengths based on a particular photochemical structure and combinations of photochemical structures utilized in the energy conversion layer 44. An intensity of the second emission 20 may be changed by adjusting the wavelength of the first emission. In addition to or in alternative to the red, green, and blue-emitting photoluminescent materials, other photoluminescent materials may be utilized alone and in various combinations to generate the second emission 20 in a wide variety of colors. In this way, the lighting system 12 may be configured for a variety of applications to provide a desired lighting color and effect for the vehicle 10.

The at least one light source 14, may refer to the plurality of light sources including the first light source 22 and the second light source 26. The at least one light source 14 may also be referred to as an excitation source and is operable to emit at least the first emission 16. The at least one light source 14 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 16.

Figure 4:
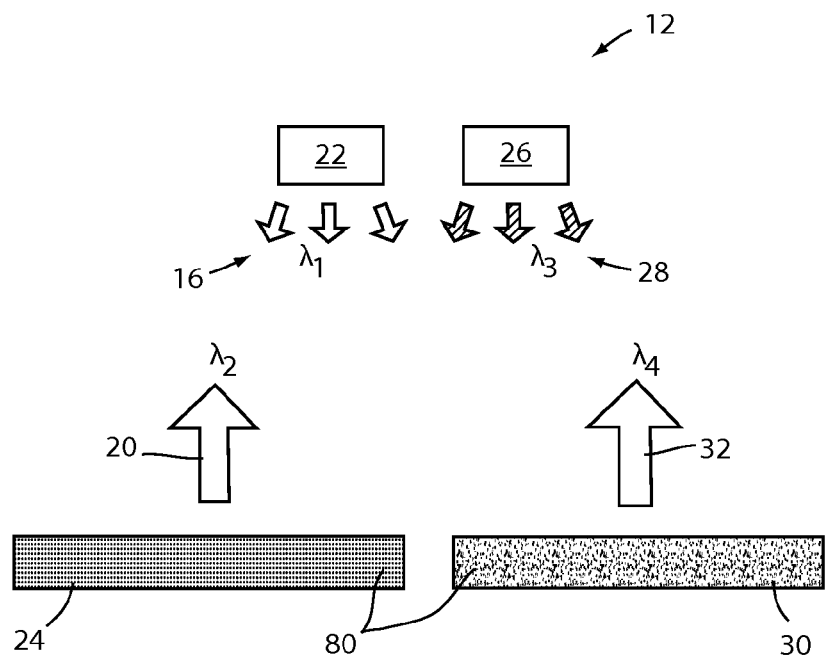
FIG. 4 illustrates the lighting system configured to convert first and second emissions of light into a third and fourth emission of light, respectively.

Referring now to FIG. 4, the lighting system 12 is shown in a configuration comprising a plurality of photoluminescent portions 80 including the first photoluminescent portion 24 and the second photoluminescent portion 30. The first photoluminescent portion 24 is configured to emit the second emission 20 in response receiving the first emission 16 from the first light source 22. The second photoluminescent portion 30 is configured to emit the fourth emission 32 in response receiving the third emission 28 from the second light source 26. Each of the plurality of photoluminescent portions 80 may be excited independently. For example, the second emission 20 may be output while the fourth emission 32 is inactive, and the fourth emission 32 may be output while the second emission 20 is inactive. This selective activation of each of the photoluminescent portions 80 may be implemented by utilizing photoluminescent materials having non-overlapping absorption ranges.

In some embodiments, the first emission 16 from the first light source 22 may be configured such that the first wavelength $\lambda_1$ corresponds to a first absorption range of the first photoluminescent portion 24. The third emission 28 from the second light source 26 may be configured such that the third wavelength $\lambda_3$ corresponds to a second absorption range of the second photoluminescent portion 30. The first absorption range may correspond to a light emission absorption range that is substantially different than the second absorption range. In this configuration, the first light source 22 may selectively activate the first photoluminescent portion 24 with the first emission 16 in the first absorption range and the second light source 26 may selectively activate the second photoluminescent portion 30 with the third emission 28 in the second absorption range.

Figure 5:
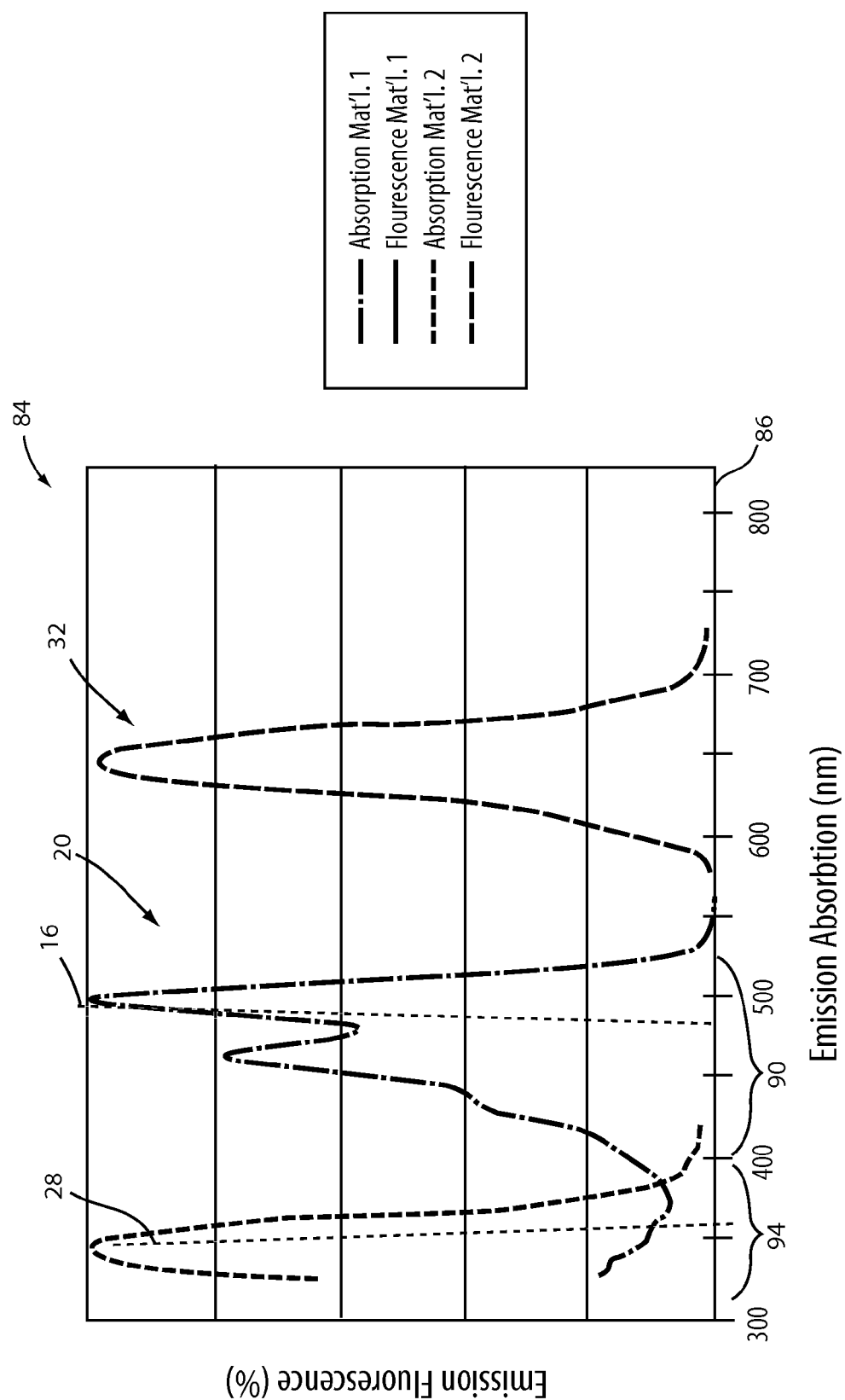
FIG. 5 is a graphical representation demonstrating a plurality of Stoke shifts corresponding to a conversion of a first and second emission of light to a third and fourth emission of light.

Referring now to FIG. 5, an exemplary graphical representation 84 of the conversion of the first emission 16 to the second emission 20 and the third emission 28 to the fourth emission 32 is shown. The independent axis 86 of the graph 84 demonstrates an absorption range in nanometers which corresponds to the wavelengths of light absorbed by the photoluminescent materials and corresponding photoluminescent portions 24 and 30. The dependent axis 88 demonstrates the emission fluorescence percentage of the photoluminescent ranges as a function of the emission absorption.

Each of the emissions 20 and 32 from the photoluminescent portions 24 and 30 are configured to output light at one or more wavelengths corresponding to the specific photoluminescent materials implemented.

In this example, the graphical representation 84 demonstrates the first absorption range 90 and the second absorption range 92 and each of the corresponding light emissions (e.g. the second emission 20 and the fourth emission 32). The first absorption range 90 corresponds to longer wavelengths of light than the second absorption range 92. In this way, the first photoluminescent portion 24 may be illuminated independent of the second photoluminescent portion 30. The absorption ranges and resulting emissions may be configured by the particular photoluminescent materials utilized in each of the photoluminescent portions 24 and 30. Various combinations of photoluminescent materials may provide for a wide range of colors and combinations of wavelengths to generate the motion effect.

The term absorption range as used herein defines a range of wavelengths that excite a photoluminescent portion or structure and cause a photoluminescent material to become excited. In response to the excitation, the photoluminescent portion emits an emission having at least one wavelength of light which is at least partially outside the absorption range. In various embodiments, the absorption range of the photoluminescent materials as discussed herein may vary. Additionally, the emission of light in the form of emitted fluorescence may be selected based on the material properties of the photoluminescent structures discussed herein.

Referring now to FIGS. 4 and 5, an example of a particular combination of photoluminescent materials and light sources is demonstrated. The first absorption range 90 may correspond to a range of wavelengths in blue and/or near UV range of light having wavelengths of approximately 390-450 nm. The second absorption range 92 may correspond to a substantially non-overlapping range of wavelengths in the UV and/or blue range of light having wavelengths of approximately 250-410 nm. The first emission 16 may be approximately 470 nm configured to cause the first photoluminescent portion 24 to output the second emission 20 of approximately 525 nm. The third emission 28 may be approximately 370 nm configured to cause the second photoluminescent portion 30 to output the fourth emission 32 of approximately 645 nm. In this way, the second emission 20 and the fourth emission 32 may be selectively excited by each of the light sources 22, 26 to independently output a substantially green colored light and a substantially orange-red colored light, respectively.

In general, the photoluminescent materials of the first photoluminescent portion 24 and the second photoluminescent portion 30 may be combined in various proportions, types, layers, etc. to generate a variety of colors for the each of the luminescent emissions. Though particular materials and structures of photoluminescent materials are discussed herein, various materials may be utilized without departing from the spirit of the disclosure. In some embodiments, the first photoluminescent portion 24 is configured to have the first absorption range 90 being substantially greater than the second absorption range 92. Additionally, the second wavelength $\lambda_2$ of the second emission 20 may be configured to output a substantially shorter wavelength or range of wavelengths than the fourth wavelength $\lambda_4$ of the fourth emission 32.

In some embodiments, the first photoluminescent portion 24 may comprise an organic fluorescent dye configured to convert the first emission 16 to the second emission 20. For example, the first photoluminescent material may comprise a photoluminescent structure of rylenes, xanthenes, porphyrins, phthalocyanines, or other materials suited to a particular Stoke shift defined by absorption range and emission fluorescence. The first photoluminescent portion 24 and corresponding material may be configured to have a shorter Stoke shift than the second photoluminescent portion. In this way, each of the photoluminescent portions 24 and 30 may be independently illuminated by the light sources 22 and 26 to output different colors of light.

The second photoluminescent portion 30 may comprise a photoluminescent structure 42 configured to generate a longer stoke shift than the first photoluminescent portion 24. The second photoluminescent portion may comprise an organic or inorganic material configured to have the second absorption range 92 and a desired output wavelength or color. In an exemplary embodiment, the photoluminescent structure 42 of the second photoluminescent portion 30 may be of at least one inorganic luminescent material selected from the group of phosphors. The inorganic luminescent material may more particularly be from the group of Ce-doped garnets, such as YAG:Ce. This configuration may provide for a second stoke shift of the second photoluminescent portion 30 to be longer than a first stoke shift of the first photoluminescent portion 24.

The first emission 16 and the third emission 28 from the light sources are shown having wavelengths in the blue spectral color range and shorter wavelengths (UV wavelengths). Such wavelengths may be utilized as excitation sources for the photoluminescent portions and provide nearly imperceptible lighting sources due to these wavelengths having limited perceptual acuity in the visible spectrum of the human eye. By utilizing shorter wavelengths for the excitation sources (e.g. the first emission 16 and the third emission 28) the lighting system 12 may create a visual effect of light originating from the photoluminescent portions 24 and 30. Further, in this configuration, light is emitted from the photoluminescent structure 42 (e.g. the first photoluminescent portion 24, the second photoluminescent portion 30) from locations of the vehicle 10 that may be inaccessible or costly to add conventional light sources requiring electrical connections.

To achieve the various colors and combinations of photoluminescent materials described herein, the lighting system 12 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

Figure 6A:
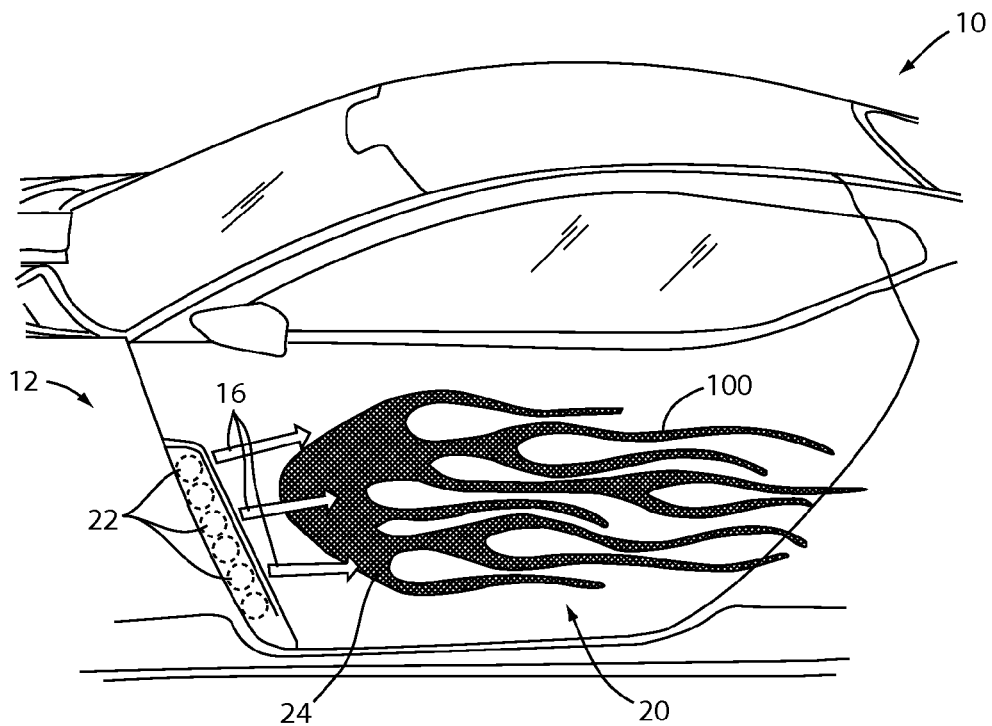
FIG. 6A is a detailed view of a first emission of light configured to illuminate a first photoluminescent portion of a vehicle.
Figure 6B:
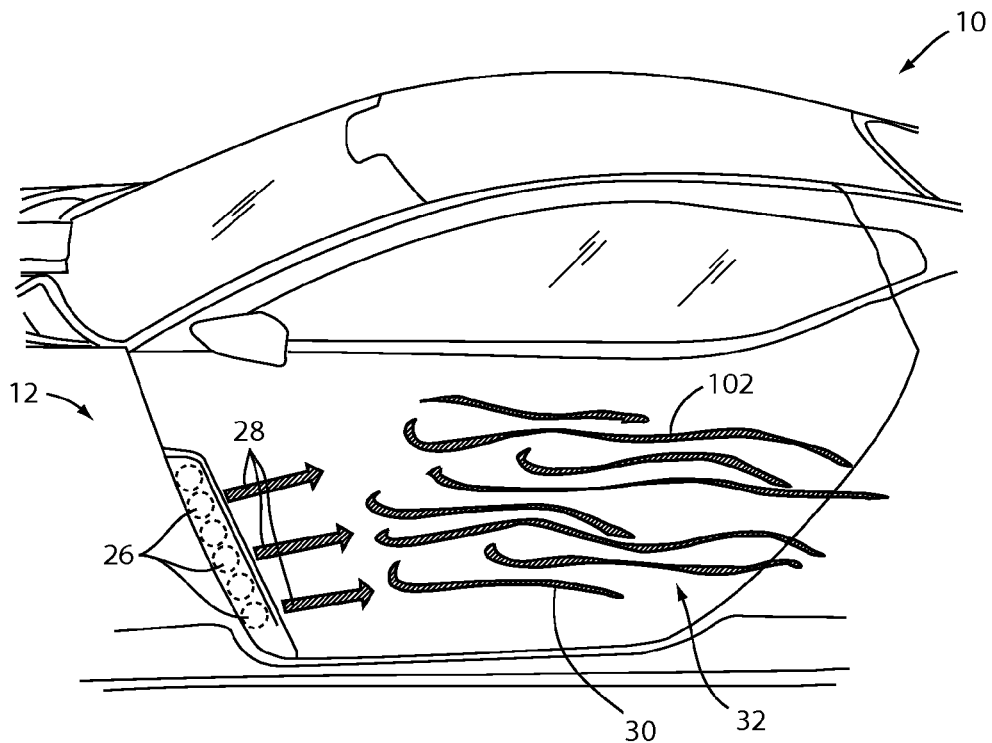
FIG. 6B is a detailed view of a second emission of light configured to illuminate a second photoluminescent portion of a vehicle.
Figure 6C:
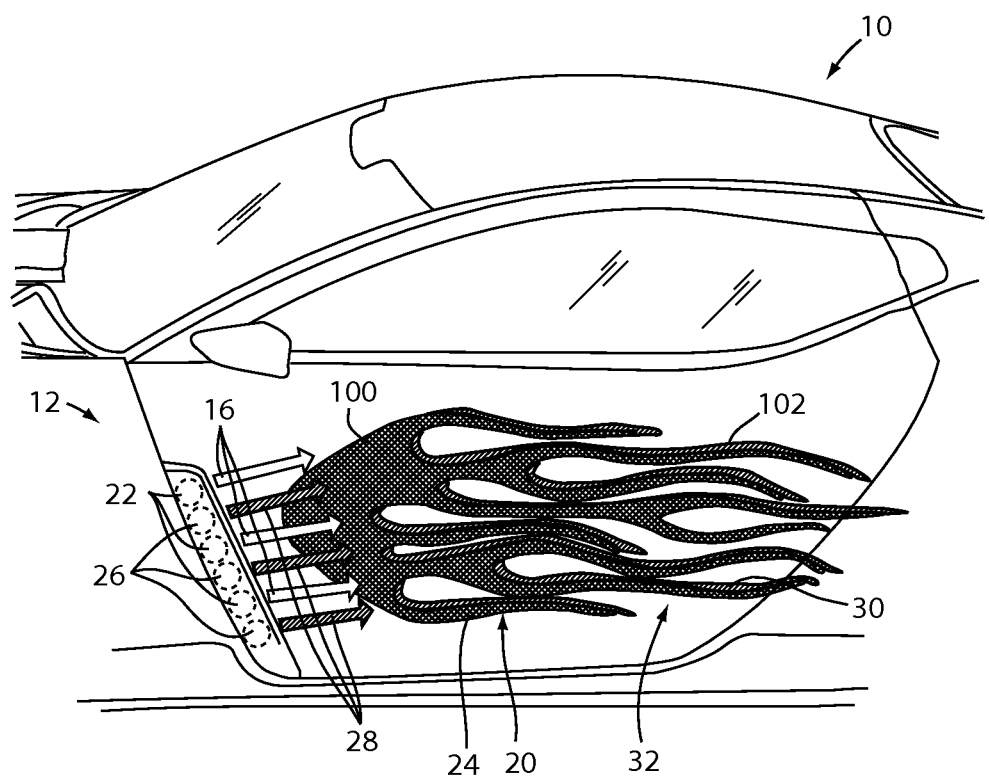
FIG. 6C is a detailed view of a first and second emission of light configured to illuminate first and second photoluminescent portions of a vehicle.

Referring now to FIGS. 6A-6C, detailed views of the first photoluminescent portion 24 and the second photoluminescent portion 30 are shown demonstrating a motion effect and/or combined accent lighting in accordance with the disclosure. As discussed herein, the lighting system 12 is operable to selectively illuminate the first photoluminescent portion 24 by emitting the first emission 16 from the first light source 22. The lighting system 12 is further operable to selectively illuminate the second photoluminescent portion 30 by emitting the third emission 28 from the second light source 26. Each of the light sources 22 and 26 may be selectively activated by one or more lighting controllers configured to control the first and second light sources 22 and 26.

The light sources 22 and 26 may be activated in combination or intermittently to generate a visual effect, for example a flickering, wavering, animated movement, etc. When activated in combination, as shown in FIG. 6C, combination of the second emission 20 and the fourth emission 32 provide for the simultaneous output of a first color 100 of light corresponding to the second wavelength $\lambda_2$ and the second color 102 of light corresponding to the fourth wavelength $\lambda_4$. As demonstrated in FIG. 5, the second wavelength $\lambda_2$ and the fourth wavelength $\lambda_4$ may each correspond to one or more wavelengths combined to form an average or perceived color of light. Each of the first color 100 and the second color 102 may correspond to different perceived colors or hues of colors that may be selectively output to generate a motion effect.

Figure 7A:
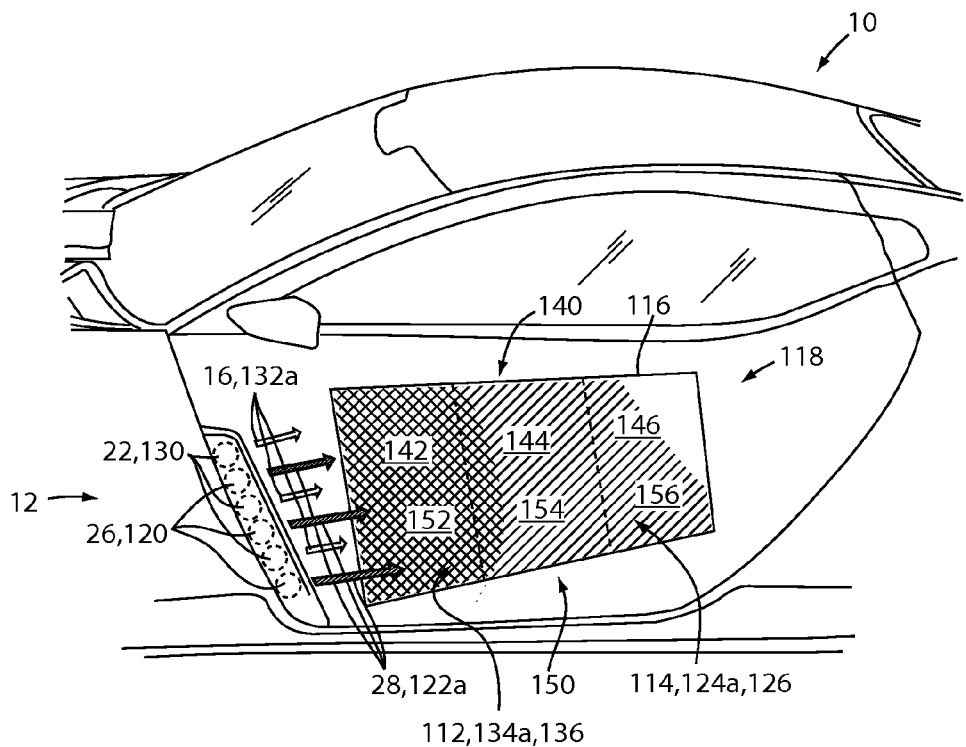
FIG. 7A is a detailed view of a first photoluminescent portion and a second photoluminescent portion configured to illuminate a surface of a vehicle.
Figure 7B:
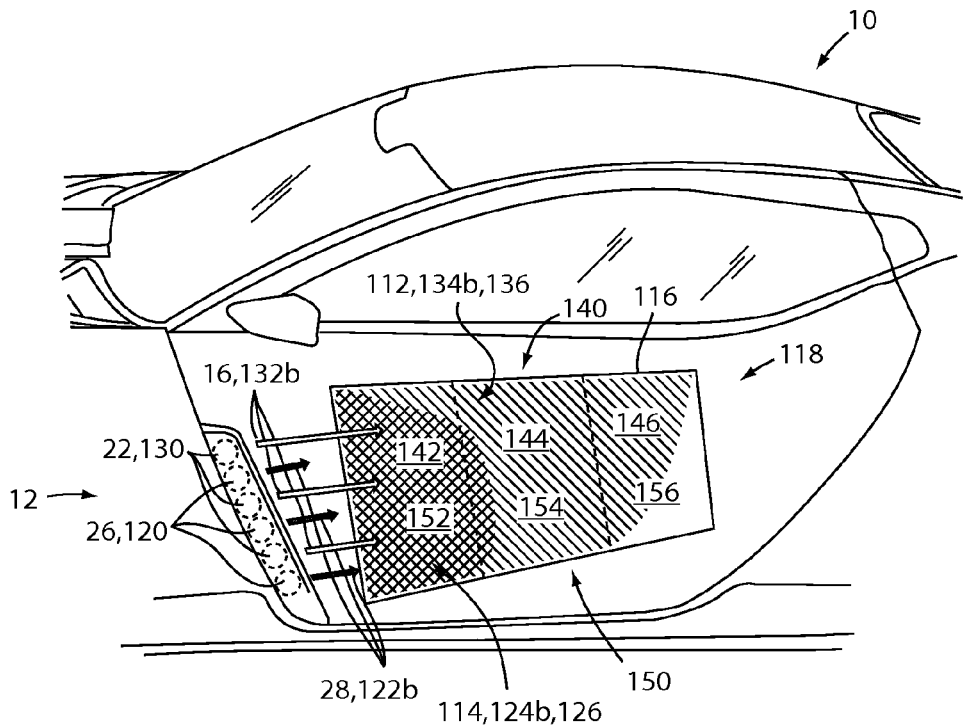
FIG. 7B is a detailed view of a first photoluminescent portion and a second photoluminescent portion configured to illuminate a surface of a vehicle

Referring now to FIGS. 7A and 7B, detailed views of a first photoluminescent portion 112 and a second photoluminescent portion 114 are shown demonstrating a fading or moving lighting effect which may be configured to generate a plurality of colors of light. In this example, each of the photoluminescent portions 112 and 114 may be similar to the first photoluminescent portion 24 and the second photoluminescent portion 30 in that the first photoluminescent portion is primarily illuminated in response to the first emission 16 from the first light source 22 and the second photoluminescent portion is primarily illuminated in response to the third emission 28 from the second light source 26. In this configuration, the first light source 22 and the second light source 26 may be configured to generate a moving, fading, and/or pulsing lighting effect by controlling the intensity and directional focus of the first light source 22 and the second light source 26.

Each of the photoluminescent portions 112 and 114 as shown form a selectively illuminated portion 116 that may correspond to a coating applied to a surface 118 of the vehicle 10 and/or at least one photoluminescent material dispersed in a paint or coating applied to the surface 118. For clarity, the selectively illuminated portion 116 is shown as a simple trapezoidal shape, however, the selectively illuminated portion 116 may correspond to any shape, design, accent, and/or combination thereof. Further, the first photoluminescent portion 112 may correspond to a first shape or design, and the second photoluminescent portion 114 may correspond to a second shape or design each having different extents and/or proportions. The first photoluminescent portion 112 may also partially or completely overlap the second photoluminescent portion 114 within the selectively illuminated portion 116.

As demonstrated in FIGS. 7A and 7B, the first photoluminescent portion 112 is demonstrated as a first pattern of lines extending downward diagonally from the upper left boundary of the selectively illuminated portion 116 to the lower right boundary of the selectively illuminated portion 116. The second photoluminescent portion 114 is demonstrated as a second pattern of lines extending upward diagonally from the lower left boundary of the selectively illuminated portion 116 to the upper right boundary of the selectively illuminated portion 116. For clarity, each of the photoluminescent portions 112 and 114 is demonstrated as extending coextensive to the boundaries of the selectively illuminated portion 116. However, each of the photoluminescent portions may be applied to any portion of the surface 118 or any other surface of the vehicle 10 where the light sources 22 and 26 may be directed.

Referring to FIG. 7A, the second light source 26 is shown as a second plurality of lighting devices 120. The lighting system 12 is operable to generate a second gradient of light or pattern 122a of light emitted as the third emission 28, as demonstrated by the length of each of the arrows denoting the third emission 28. Corresponding to the pattern 122a of light, an illuminated area 124a of the second photoluminescent portion 114 may be excited to emit a fourth emission 126. The first light source 22 comprises a first plurality of lighting devices 130 and is also operable to generate a first gradient of light or pattern 132a of light emitted as the first emission 16, as demonstrated by the length of each of the arrows denoting the first emission 16. Corresponding to the pattern 132a of light, an illuminated area 134a of the first photoluminescent portion 112 is excited to emit a second emission 136. In this configuration, each of the light sources 22 and 26, and their respective lighting devices 130 and 120 are operable to selectively illuminate various patterns and portions of each of the photoluminescent portions 112 and 114.

Referring to FIG. 7B, as a further example, the lighting system 12 is operable to generate a first gradient of light or pattern 132b of light emitted as the first emission 16, as demonstrated by the length of each of the arrows denoting the first emission 16. Corresponding to the pattern 132b of light, an illuminated area 134b of the first photoluminescent portion 112 is excited to emit the second emission 136. The second light source 26 comprises the second plurality of lighting devices 120 and is also operable to generate the second gradient of light or pattern 122b of light emitted as the third emission 28. Corresponding to the pattern 122b of light, an illuminated area 124b of the second photoluminescent portion 114 is excited to emit the fourth emission 126.

The various lighting emissions and corresponding patterns, emitted from the first plurality of lighting devices 130 and the second plurality of lighting device 120, may be configured to illuminate different extents, portions and patterns of photoluminescent emissions from the surface 118. The photoluminescent emissions are selectively generated by each of the lighting devices 130 and 120 by exciting the photoluminescent materials of the first photoluminescent portion 112 and the second photoluminescent portion 114. The various patterns of light emitted from the photoluminescent portions 130 and 120 may be controlled by the lighting intensity and selective illumination of each lighting device of the lighting devices 130 and 120. In this configuration, the lighting system 12 is operable to generate various patterns of light and lighting effects on the surface 118 of the vehicle 10. In some embodiments, the lighting system 12 is operable to generate fading, moving, pulsing, and various additional lighting patterns by selectively activating the second emission 136 and the fourth emission 126 in response to the activation of the first plurality of lighting devices 130 and the second plurality of lighting device 120.

As discussed herein, the first photoluminescent portion 112 and the second photoluminescent portion 114 may correspond to a first color and a second color, respectively. Each of the photoluminescent portions 112 and 114 may also be configured to have a first absorption range 90 and a second absorption range 92 as discussed in reference to FIG. 5. In general, the first absorption range and the second absorption range may correspond to substantially different ranges or partially overlapping ranges of wavelengths of light emitted from the first light source 22 and the second light source 26. In the example wherein the first and second absorption ranges correspond to substantially different wavelengths of light, the first photoluminescent portion 112 and the second photoluminescent portion 124 may be excited independently by their respective light sources 22 and 26. In the example wherein the first absorption range and the second absorption range are partially overlapping, the first photoluminescent portion 112 and the second photoluminescent portion 124 may be excited partially by each of the light sources 22 and 26 to vary the intensity and generate a blending effect of the first photoluminescent portion 112 and the second photoluminescent portion 114.

For example, the first light source 22 may illuminate the first photoluminescent portion 112 with an efficiency of approximately 90 percent and also illuminate the second photoluminescent 114 portion with an efficiency of approximately 40 percent. The efficiency of each of the light sources 22 and 26 to illuminate the photoluminescent portions 112 and 114 may be controlled by selecting light sources that emit desired wavelengths of light. The desired wavelengths of light may correspond to different portions of an absorption range of a particular photoluminescent material or combination of photoluminescent materials. In this configuration, the first light source 22 may be operable to blend the emitted from the first photoluminescent portion 112 with the second color emitted from the second photoluminescent portion 114. Similarly, the second light source 26 may be operable to blend the second color emitted from the second photoluminescent portion 114 with the emitted from the first photoluminescent portion 112. By varying the intensities from each lighting device of the plurality of lighting devices 130 and 120, the light system is operable to generate variety of colors of light, patterns of light, motion effects, and combinations thereof.

In some embodiments, the first photoluminescent portion 112 may further be configured to emit a plurality of colors of light from a first plurality of colored portions 140. For example, the first photoluminescent portion 112 may comprise a first colored portion 142, a second colored portion 144, and a third colored portion 146. Each of the colored portions 142, 144, 146 may be configured to be excited with various levels of efficiency in response to the first emission 16 from the first light source 22. Further, the second photoluminescent portion 114 may be configured to emit a plurality of colors of light from a second plurality of colored portions 150. The second photoluminescent portion 114 may comprise a fourth colored portion 152, a fifth colored portion 154, and a sixth colored portion 156. Each of the colored portions 152, 154, 156 may be configured to be excited with various levels of efficiency in response to the second emission 28 from the second light source 26.

Though the colored portions 142, 144, 146, 152, 154, and 156 are demonstrated as overlapping portions of the first photoluminescent portion 112 and the second photoluminescent portion 114, each of the colored portions may be applied to distinct and/or partially overlapping portions of the surface 118. In this way, the lighting system 12 provides for the illumination of various patterns, colors, designs, lighting effects, and motion effects. The lighting system 12 is operable to control the intensity of each colored portion 142, 144, 146, 152, 154, and 156 at various levels and intensities by controlling each lighting device of the pluralities of lighting devices 130, 120. As demonstrated by the various examples and configurations described herein, the lighting system provides for a flexible lighting system operable to provide a variety of lighting effects. The lighting system 12 also has the additional benefit of being operable to generate various lighting effects while maintaining a low cost of implementation.

Referring now to FIGS. 8A, 8B, 8C, and 8D, a lighting system 178 may be configured to illuminate a surface 180 of a vehicle 182. The lighting system 178 may embody various features and elements discussed in reference to the lighting system 12. As such, like reference numerals may be utilized to describe various elements of the lighting system 178. The lighting system 178 may be configured to illuminate a first graphic 184 and a second graphic 186. Each of the first graphic 184 and the second graphic 186 may be configured to selectively illuminate in response to receiving an emission from at least one light source 188. The lighting system 178 may also be configured to interact with environmental lighting conditions (daytime, nighttime, artificial lighting, etc.) to provide various visual effects displayed by selectively illuminating the first graphic 184 and the second graphic 186.

The term, graphic, as used herein may refer to any form of character, logo, marking, shape, and any other form of design. As such, each of the first graphic, the second graphic, and any other graphics, design, logos, and/or characters may be interchanged, combined, and/or blended to achieve a desired appearance for the first graphic 184 and the second graphic 186. For example, the first graphic 184 is shown as a logo or group of characters, and the second graphic is shown as a shape. However, in various embodiments, the first graphic 184 and the second graphic 186 may correspond to any combination of characters, designs, logos, shapes, and/or markings disposed on a surface of a vehicle.

The at least one light source 188 may be disposed on the surface 180 of the vehicle 182, and in some embodiments, may be concealed behind a panel or trim strip 190. In this configuration, the lighting system 12 may be operable to project light from the at least one light source 188 which may result in the first graphic 184 and the second graphic 186 becoming illuminated. In some embodiments, the at least one light source 188 may comprise the first light source 22 and the second light source 26. The first light source 22 and the second light source 26 may each be configured in an array of emitters extending longitudinally along the surface 180 of the vehicle 182. Similar to the lighting system 12, the first light source 22 may be configured to emit a first emission 16, and the second light source 26 may be configured to emit a third emission 28. For clarity, the first light source 22 is only indicated by reference numeral 22 in FIGS. 8B and 9, and the second light source 26 is only indicated by reference numeral 26 in FIGS. 8C and 9. Corresponding reference numerals for the first emission 16 and the second emission 28 may also be indicated in FIGS. 8B and 9, and FIGS. 8C and 9, respectively.

Figure 8A:
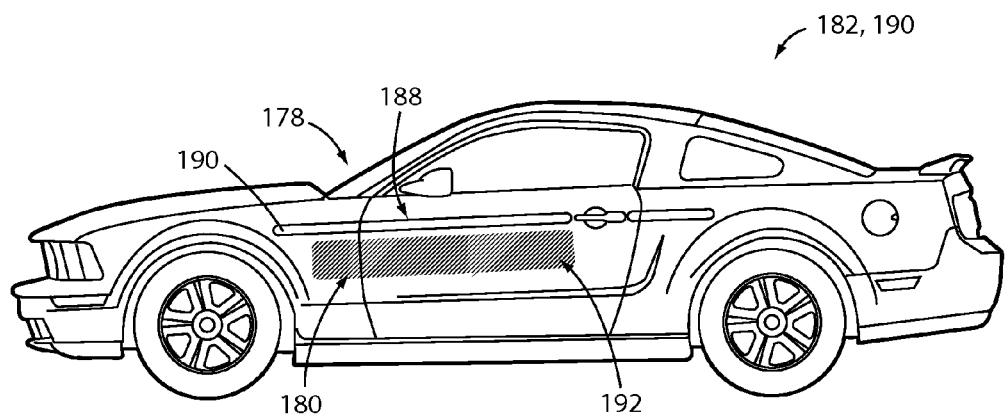
FIG. 8A is a side view of a vehicle comprising a lighting system operable to illuminate a surface of the vehicle from a concealed light source.

FIG. 8A demonstrates the lighting system 178 in a first state 270 corresponding to the first light source 22 and the second light source 26 being inactive. As illustrated, FIG. 8A may demonstrate the appearance of the surface 180 in a daytime or nighttime lighting condition. The surface 180 of the vehicle 182 is shown having a modeled or textured appearance in the form of a mask 192 corresponding to a region that may be illuminated by the at least one light source 188. The surface 180 may also correspond to a region of the vehicle 182 wherein the first graphic 184 and the second graphic 186 may be incorporated. In some embodiments, the surface 180 may be painted and/or coated in an enamel and/or paint configured to provide the textured appearance.

In some embodiments, the mask 192 may serve to diminish and conceal emissions of light corresponding to the first graphic 184 and the second graphic 186 resulting from environmental lighting conditions. For example, the first graphic 184 and the second graphic 186 may comprise at least one photoluminescent material that may become excited in response to receiving at least one wavelength of light from an environmental lighting source, for example the sun. As a result, the first graphic 184 and the second graphic 186 may be at least partially visible when the first light source 22 and the second light source 26 are inactive. By applying the mask 192 to the surface 180, the first graphic 184 and the second graphic 186 may be substantially hidden even when exposed to environmental lighting conditions.

In some embodiments, the mask 192, incorporating the modeled or textured appearance, may be applied to the entirety of the vehicle 182 to provide a substantially uniform painted appearance. Similarly, the paint of the vehicle 182 may be textured similar to the mask 192. The mask 192 may also be configured to appear as a paint accent, for example a racing stripe. In this way, the first graphic 184 and the second graphic 186 may be concealed in a variety of ways when the surface 180 is exposed to environmental lighting conditions.

Though the mask 192 is described as being utilized to diminish and/or conceal the first graphic 184 and the second graphic 186 when exposed to environmental lighting conditions, in some embodiments, the mask 192 may not be utilized. The luminance of the first graphic 184 and the second graphic 186 in response to environmental lighting conditions may be highly dependent on a combination of a color of paint of the vehicle 182, a concentration and/or intensity of a photoluminescent material utilized in the graphics 184 and 186, and one or more colors emitted by photoluminescent materials utilized in the graphics 184 and 186. For example, sunlight may cause each of the first graphic 184 and the second graphic 186 to illuminate by supplying an excitation emission similar to the first and/or third emissions 16 and 28. However, if the concentration and/or intensity of photoluminescent materials utilized to generate emissions from the first graphic 184 and the second graphic 186 is limited, the broad-spectrum of the sunlight may partially or completely washout and/or hide any substantially visible evidence that the first graphic 184 and the second graphic 186 are illuminated. As such, the mask 192 may be utilized in some embodiments and may not be desirable in others.

Figure 8B:
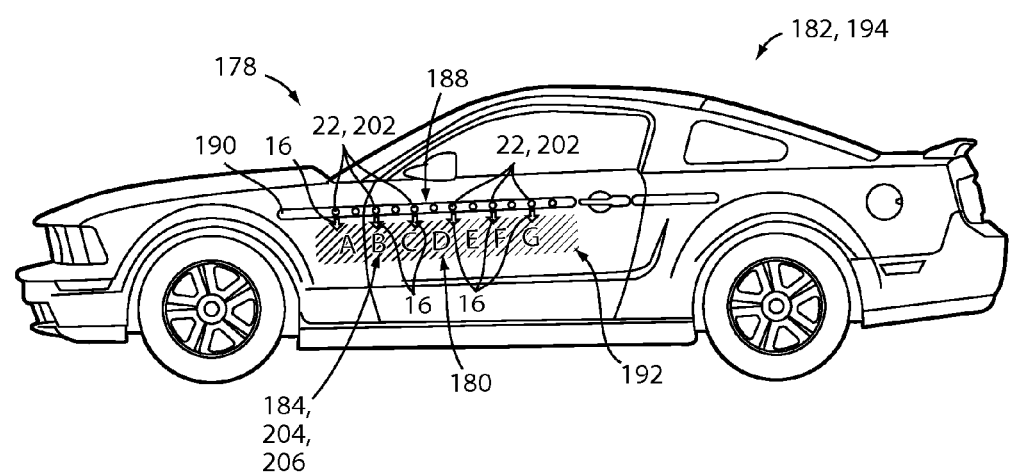
FIG. 8B is a side view of a vehicle comprising a lighting system demonstrating a first photoluminescent graphic illuminated by a first light source.
Figure 8C:
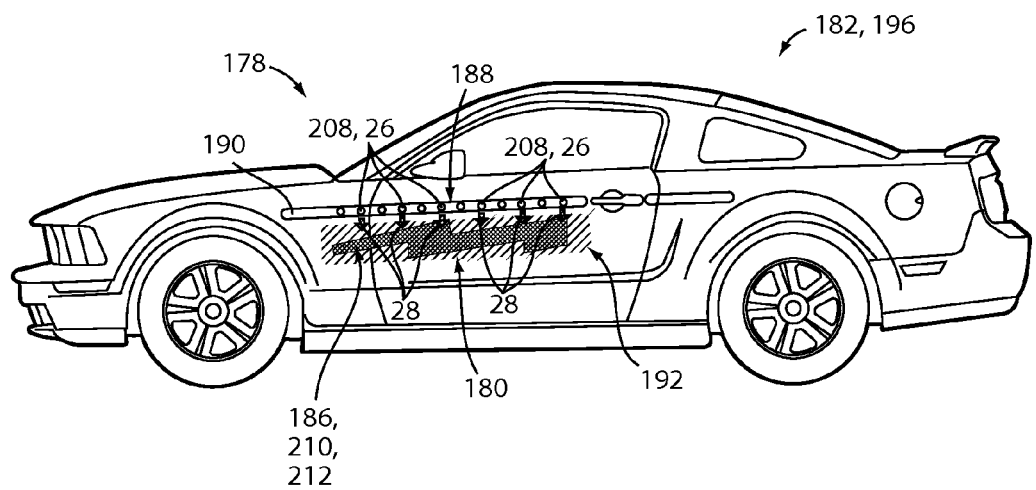
FIG. 8C is a side view of a vehicle comprising a lighting system demonstrating a second photoluminescent graphic illuminated by a second light source.
Figure 8D:
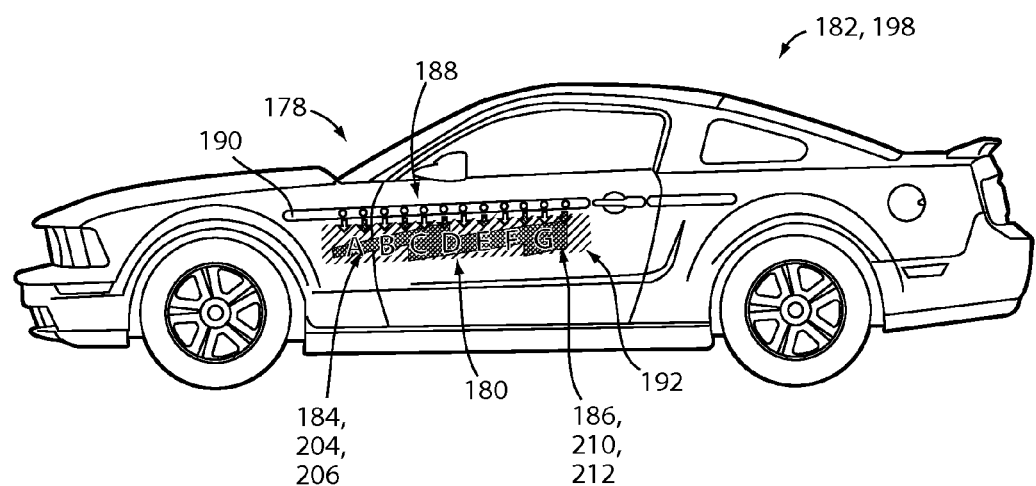
FIG. 8D is a side view of a vehicle comprising a lighting system demonstrating a plurality of photoluminescent graphics illuminated by at least one light source.

Referring now to FIGS. 8B, 8C, and 8D, the lighting system 178 is illustrated in a second state 194, a third state 196, and a fourth state 198, respectively. A resulting exemplary appearance of the surface 180 as demonstrated in FIGS. 8B, 8C, and 8D may correspond to an environmental lighting condition that does not include the first wavelength and the third wavelength corresponding to the first emission 16 and the third emission 28. That is, the lighting condition may not correspond to one or more excitation emissions configured to excite the photoluminescent materials corresponding to the first graphic 184 and the second graphic 186. For example, the environmental lighting condition may correspond to a nighttime lighting condition or an artificial lighting condition, such as a lighting condition of a vehicle showroom.

Additionally, FIGS. 8B, 8C, and 8D depict the mask 192 in a less apparent and lighter texture than FIG. 8A. This depiction of the mask 192 may provide an exemplary illustration of an embodiment of the lighting system 178 wherein the mask 192 is employed. The less apparent and lighter texture of the mask 192 may serve to demonstrate that during artificial and nighttime lighting conditions, a contrast between the mask 192 and other surfaces of the vehicle 182 may be less apparent. It may also be reiterated at this point that the mask 192 may not be incorporated in some embodiments of the lighting system 178 or maybe blended to match the appearance of the other surfaces of the vehicle 182.

FIG. 8B demonstrates the lighting system 178 having the first light source 22 activated such that the first emission 16 is emitted toward the surface 180 from a corresponding first array of emitters 202. The second light source 26 may be inactive in this configuration. In response to receiving the first emission 16, a first photoluminescent portion 204 corresponding to the first graphic 184 may become excited and emit a second emission 206. In this configuration, the first photoluminescent portion 204 of the first graphic 184 may be illuminated to a substantially higher level of illumination or brightness than the second graphic 186. The higher level of illumination of the first graphic 184 relative to the second graphic 186 in response receiving the first emission 16 may be due to the first photoluminescent portion 204 having the first absorption range 90.

Referring to FIG. 8C, the lighting system 178 is shown having the second light source 26 activated such that the third emission 28 is emitted toward the surface 180 from a corresponding second array of emitters 208. The first light source 22 may be inactive in this configuration. In response to receiving the third emission 28, a second photoluminescent portion 210 corresponding to the second graphic 186 may become excited and emit a fourth emission 212. In response to receiving the third emission 28, the second photoluminescent portion 210 of the second graphic 186 may be illuminated to a substantially higher level of illumination than the first graphic 184. As such, the lighting system 178 may be operable to selectively illuminate the first photoluminescent portion 204 substantially independent of the second photoluminescent portion 210.

As discussed herein, the first photoluminescent portion 204 and the second photoluminescent portion 210 may correspond to a first color and a second color respectively. Each of the photoluminescent portions 204 and 210 may also be configured to have the first absorption range 90 and the second absorption range 92, as discussed in reference to FIG. 5. In general, the first absorption range and the second absorption range may correspond to substantially different ranges or partially overlapping ranges of wavelengths of light emitted from the first light source 22 and the second light source 26, respectively. In the example wherein the first and second absorption ranges correspond to substantially different wavelengths of light, the first photoluminescent portion 204 and the second photoluminescent portion 210 may be excited independently by their respective light sources 22 and 26.

In the example wherein the first absorption range and the second absorption range are partially overlapping, the first photoluminescent portion 204 and the second photoluminescent portion 210 may be excited partially by each of the light sources 22 and 26. For example, the first wavelength of the first emission 16 may cause the second photoluminescent portion 210 to become illuminated at a lower intensity or brightness than the third wavelength of the third emission 28. Similarly, the third wavelength of the third emission 28 may cause the first photoluminescent portion 204 to become illuminated at a lower intensity or brightness than the first wavelength of the first emission 16. In this configuration, each of the light sources 22 and 26 may be configured to partially illuminate each of the photoluminescent portions 204 and 210 at different intensities to illuminate each of the graphics 184 and 186 in various combinations.

Referring to FIG. 8D, the lighting system 178 is shown having both the first and second lighting sources 22 and 26 activated. In this configuration, both the first emission 16 and the third emission 28 may be emitted toward the surface 180. In response to receiving the excitation emissions 16 and 28, both of the photoluminescent portions 204 and 210 may become excited and emit the second emission 206 and the fourth emission 212, respectively. In this way, the lighting system 178 may be operable to selectively illuminate both the first photoluminescent portion 204 and the second photoluminescent portion 210.

Figure 9:
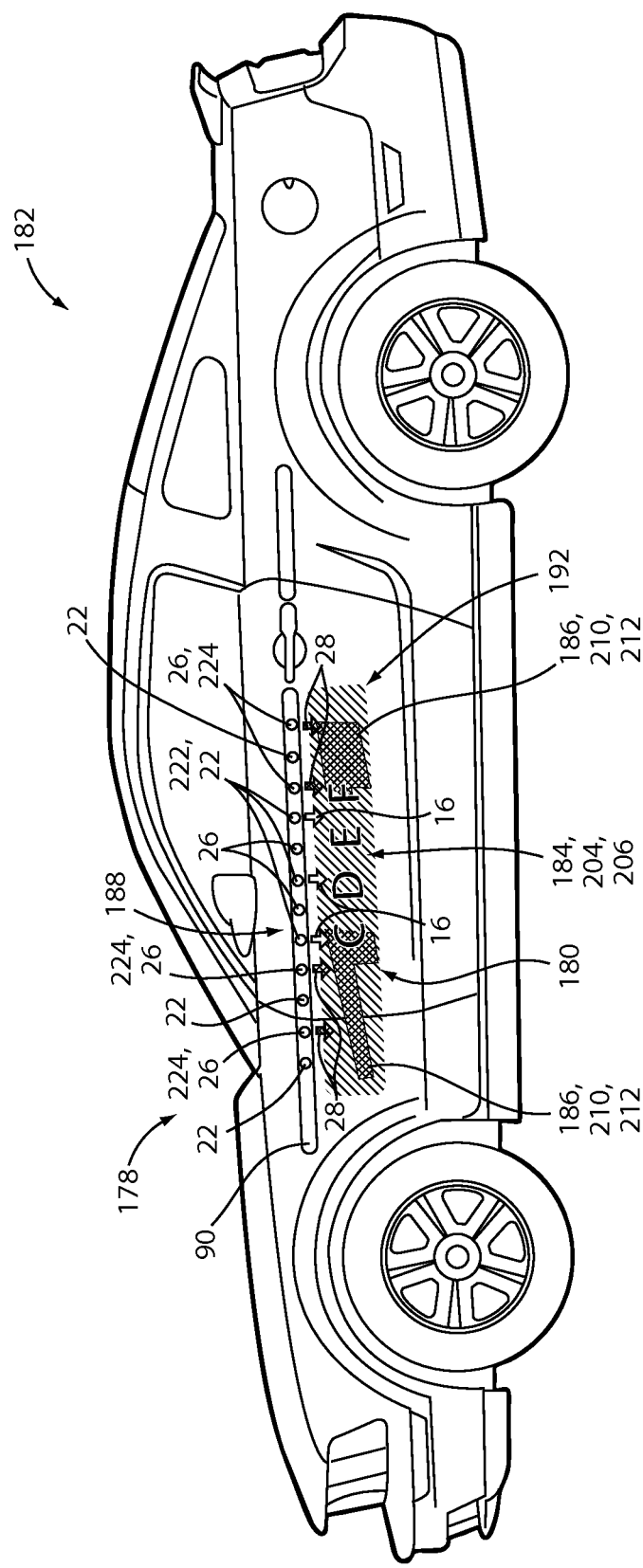
FIG. 9 is a side view of a vehicle comprising a lighting system demonstrating a first photoluminescent graphic and a second photoluminescent graphic illuminated by a plurality of light sources.

In some embodiments, the lighting system 178 may be configured to selectively illuminate each light emitter of the first array of emitters 202 and/or the second array of emitters 208. Referring to FIG. 9, the lighting system 178 is shown illuminating a portion of the first graphic 184 by selectively activating a first selection of emitters 222 of the first array of emitters 202 corresponding to the first light source 22. A portion of the second graphic 186 may also be illuminated by selectively activating a second selection of emitters 224 of the second array of emitters 208 corresponding to the second light source 26. In this configuration, the lighting apparatus 178 may be operable to create a variety of visual effects by illuminating various combinations of emitters to illuminate portions of the first graphic 184 and/or the second graphic 186.

As described herein, a selection of emitters (e.g. 222 and 224) may correspond to one or more contiguous or non-contiguous emitters of each of the arrays of emitters 202 and 208. Some examples of visual effects that may be generated by the lighting system 178 may include sequentially or randomly activating each of the emitters of each of the arrays of emitters 202 and 208 strobing of one or more emitters, and/or flickering various selections of the emitters. Additionally, each emitter may be varied in intensity to vary the intensity of the first emission 16 and/or the third emission 28. In this way, the lighting apparatus 178 may be operable to generate a blending effect of the second emission 206 and the fourth emission 212 from the first photoluminescent portion 204 and the second photoluminescent portion 210, respectively.

For example, the first light source 22 may be activated at a first intensity which may be approximately 50% of a total first intensity. In response, the first photoluminescent portion 204 may illuminate the first graphic 184 at approximately 50% of a maximum intensity of the second emission 206. Additionally, the second light source 26 may be activated at a second intensity, which may be approximately 10% of a total second intensity. In response, the second photoluminescent portion 210 may illuminate the second graphic 186 at approximately 10% of a maximum intensity of the fourth emission 212. In this way, the lighting system 178 may be operable to illuminate the first graphic 184 and the second graphic at various intensities to adjust, blend, and/or project lighting in the form of second emission 206 and/or the fourth emission 212 in various combinations. The lighting system 178 may be operable to adjust the intensity of each emitter of the light sources 22 and 26 by varying a magnitude and/or a duty cycle of the voltage/current supplied to the light sources 22 and 26 or each individual emitter of the first and second arrays of emitters 202 and 208. In this way, the lighting system 178 may be operable to adjust the brightness or intensity level of light emitted as the first emission 16 and the third emission 28.

In some embodiments, the lighting system 178 may further be operable to selectively activate the light sources 22 and 26 to illuminate the first graphic and/or the second graphic in various intensities, patterns, and sequences in response to at least one vehicle state. A lighting controller of the lighting system may be in communication with a vehicle control module such that the lighting controller may control the light sources 22 and 26 in response to signals received from the vehicle control module. The signals from the vehicle control module may identify an operating state of the vehicle 182. The lighting controller may comprise one or more circuits and/or processors operable to control the light sources 22 and 26 in response to receiving signals from the vehicle controller configured to identify a state of the vehicle 182.

For example, the lighting controller may be operable to control an intensity or illumination level of the light sources 22 and 26 in response to an ambient light condition, a presence detection, or any form of sensory interface. The lighting controller may also selectively activate the light sources 22 and 26 in response to an ignition event, a locking, unlocking actuation, a gear selection, emergency brake actuation, etc. In some embodiments, the lighting system 178 may also be configured to selectively illuminate the light sources 22 and 26 in response to a presence or proximity detection of a vehicle key or key fob, and/or a signal from a remote keyless entry device.

Figure 10A:
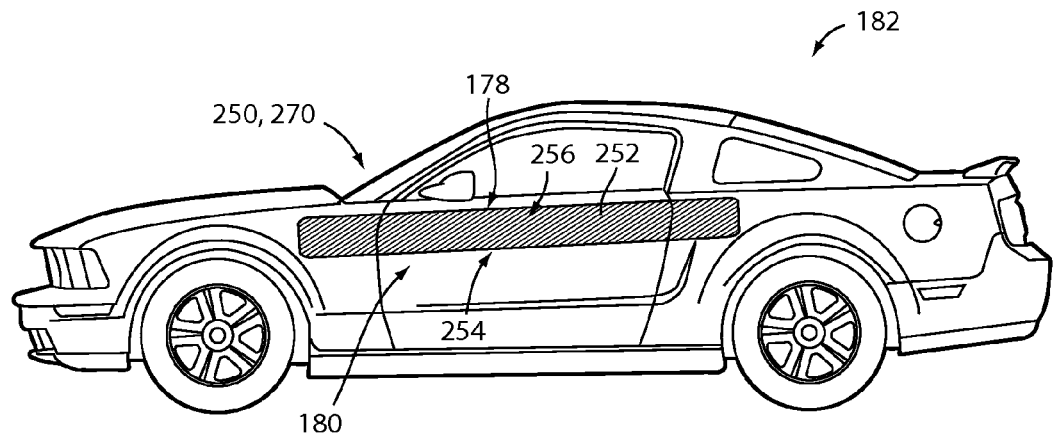
FIG. 10A is a side view of a vehicle comprising a lighting system configured to illuminate a trim portion of a vehicle in an unilluminated state.
Figure 10B:
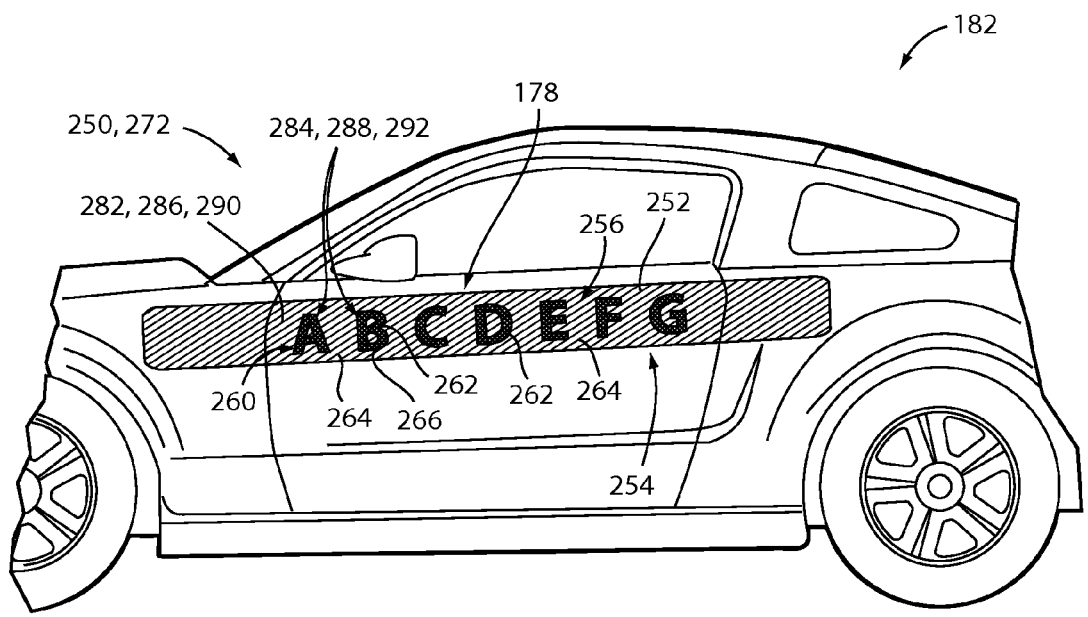
FIG. 10B is a side view of a vehicle comprising a lighting system configured to illuminate a trim portion of a vehicle in an illuminated state.

Referring now to FIGS. 10A and 10B, a lighting system 250 may be configured to illuminate a trim portion 252 disposed on the surface 180 of the vehicle 182. The lighting system 250 may embody various features and elements discussed in reference to the lighting system 12 and the lighting system 178. As such, like reference numerals may be utilized to describe various elements of the lighting system 250. The lighting system 250 may be configured to illuminate at least one photoluminescent portion 254 in response to receiving the first emission 16 from at least one light source 256. In response to receiving the first emission 16, the at least one photoluminescent portion 254 may become excited and illuminate the trim portion 252 by emitting light in a first color.

In some embodiments, the at least one photoluminescent portion 254 may be configured to reveal a graphic 260 by selectively illuminating a pattern or shape of the trim portion 252 corresponding to the at least one photoluminescent portion 254. The term graphic, as used herein may refer to any form of character, logo, marking, shape, and any other form of design or combination thereof. The graphic 260 may be filled or outlined by the at least one photoluminescent portion 254. For example, in response to receiving the first emission 16 from the at least one light source 256, the at least one photoluminescent 254 portion may directly illuminate an interior portion 262 of the graphic 260 or an exterior portion 264 of the graphic 260. The interior portion 262 may correspond to a region inside an outline 266 of the graphic 260, and the exterior portion 264 may correspond to a region outside the outline 266 of the graphic 260. As such, the lighting system 250 may be operable to illuminate the interior portion 262 or the exterior portion 264 to reveal the graphic 260.

Referring now to FIG. 10A, the lighting system 250 is demonstrated in a first state 270 or an inactive state configured to mask and/or hide the graphic 260. In the first state 270, the trim portion 252 may be configured to have a dead-front appearance configured to conceal the graphic 260. The trim portion 252 may be composed of an at least partially light transmissive material suitable for use on the vehicle 182, for example a polymeric material or any corrosion resistant light transmissive material. In order to mask the graphic 260, the trim portion may be colored and/or tinted to ensure that the graphic 260 is substantially hidden from visual recognition in a wide variety of lighting conditions, including direct sunlight.

As discussed in reference to FIG. 8A, sunlight or other external light sources may include a wavelength corresponding to the first wavelength of the first emission 16 or any other excitation wavelength that may excite the at least one photoluminescent portion 254. In some embodiments, the coloring or tinting may be sufficient to mask the illumination emitted from the photoluminescent portion 254. As shown in FIG. 8A, the trim portion is shaded to demonstrate a translucent smoked appearance. In some embodiments, a light absorbing or reflecting layer may also be disposed on the trim portion 252 or dispersed in the material of which the trim portion 252 is composed. For example, an optical coating or thin film may be applied to and/or dispersed in the trim portion such that wavelengths of light corresponding to excitation emissions may be prevented from reaching the photoluminescent portion 254.

For example, an excitation emission from an external light source, such as light at the first wavelength, may be limited from reaching the photoluminescent portion 254 by a light reflecting or absorbing layer to ensure that the photoluminescent material is not excited by external light sources. Some examples of optical coatings that may be utilized for the light reflecting or absorbing layer may include absorptive, dichroic, and/or a variety of other light reflective coatings and/or filters operable to attenuate the passage of wavelengths of light therethrough. The light reflecting or absorbing layer may be disposed on the trim portion 252 approximately to limit the passage of wavelengths less than 500 nm. In some embodiments, an exterior surface of the trim portion 252 may be vacuum metallized. In such embodiments, a metallized coating may serve to provide a metallic and/or chrome appearance to the trim portion 252 while reflecting excitation wavelengths (e.g. the first wavelength) such that the photoluminescent portion 254 remains dormant in the inactive or first state 270. In this way, the disclosure provides for a variety of embodiments to ensure that the photoluminescent portion 254 may be selectively illuminated by the light source 256 even when exposed to external light sources.

Referring now to FIG. 10B, the lighting system 250 is demonstrated in a second state 272 or an active state configured to illuminate the photoluminescent portion 254. By illuminating the photoluminescent portion 254, the lighting system may further be operable to illuminate and/or reveal the graphic 260. In some embodiments, the at least one photoluminescent portion 254 may comprise a first photoluminescent portion 282 and a second photoluminescent portion 284. In such embodiments, the first photoluminescent portion 282 may correspond to a first graphic 286 and the second photoluminescent portion 284 may correspond to a second graphic 288. The first graphic 286 may correspond to the interior portion 262, and the second graphic may correspond to the exterior portion 264 of the graphic 260. In this configuration, the light source 256 may be operable to illuminate the first photoluminescent portion 282 and the second photoluminescent portion 284 by emitting the first emission 16.

As discussed herein, each of the photoluminescent portions 282 and 284 may be configured to emit light in a first color 290 and a second color 292, respectively. An emission color or luminance color of the emissions output from each of the photoluminescent portions 282 and 284 may be controlled by utilizing specific types and combinations of photoluminescent materials in the photoluminescent structure 42 of each of the photoluminescent portions 282 and 284. Each of the photoluminescent portions 282 and 284 may have similar or different absorption ranges that may excite an energy conversion layer 44 of each, respectively. In this way, the lighting system 250 may be operable to illuminate the first photoluminescent portion 282 in the first color 290 and the second photoluminescent portion 284 in the second color 292 by activating the light source 256 to emit the first emission 16.

Figure 11:
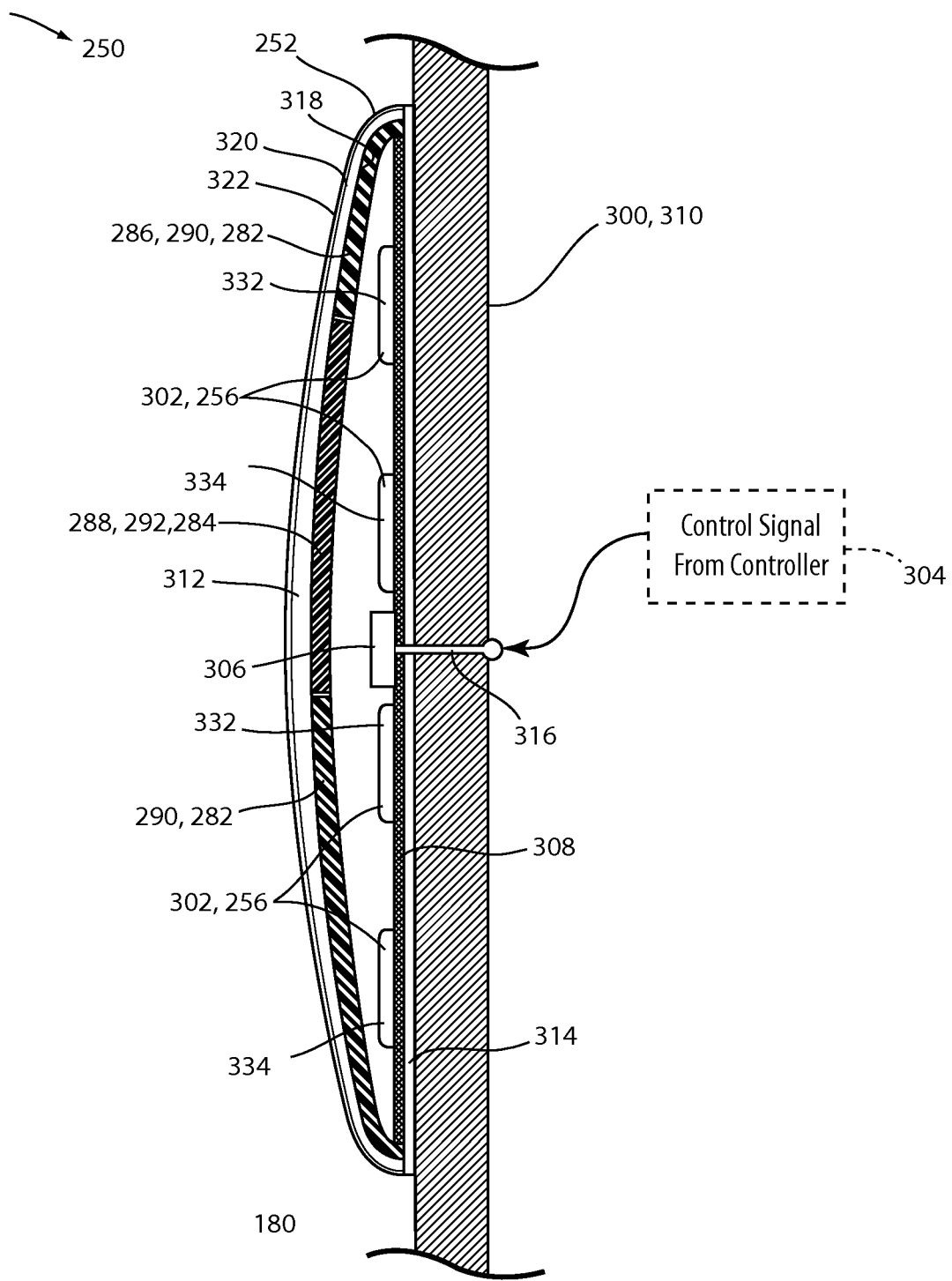
FIG. 11 is a detail cross-sectional view of a lighting system disposed on a surface of a vehicle in accordance with the disclosure.

Referring now to FIG. 11, a cross-sectional view of the lighting apparatus 300 of the lighting system 250 is shown. The lighting apparatus 300 may be connected, or affixed to the surface 180 of the vehicle 182 via an adhesive, fasteners, and/or a variety of additional methods. The at least one light source 256 may comprise an array of light sources 302, for example LEDs configured to emit UV or blue light approximately less than 500 nm in wavelength. Each emitter of the array of light sources 302 may correspond to a side-lit emitter, for example a side-lit LED. The array of light sources 302 may be in communication with a lighting controller 304 of the vehicle 182 via a control circuit 306. The control circuit 306 may comprise at least one processor, controller, and or circuitry configured to control the emissions from each emitter of the array of light sources 302. The control circuit 306 may be in communication with each of the emitters of the array 302 via a printed circuit board 308. In this configuration, the lighting apparatus 300 may be operable to control the array of light sources 302 to generate a variety of patterns and intensities of light emitted from the first photoluminescent portion 282 and the second photoluminescent portion 284 in a back-lit configuration 310.

The trim portion 252 may comprise a cover portion 312 configured to connect to a base 314. The base 314 may be configured to be affixed to the surface 180 of the vehicle 182 and may comprise a communication port 316 arranged such that the lighting apparatus 300 may be in communication with the lighting controller 304. The communication port 316 may be configured to receive one or more conductive wires configured to transmit operating power for the control circuit 306. The communication port 316 may also provide for a communication path such that the control circuit 306 may be in communication with the lighting controller 304.

The cover portion 312 comprises the interior surface 318 and the exterior surface 320. In some embodiments, the at least one photoluminescent portion 254 may be disposed as a film or coating on the interior surface 318 of the cover portion 312. The first photoluminescent portion 282 and the second photoluminescent portion 284 may also be disposed on the interior surface 318. As demonstrated in FIG. 11, the first photoluminescent portion 282 and the second photoluminescent portion 284 may be arranged in a pattern corresponding to a cross-section of the first graphic 286 and the second graphic 288. Each of the photoluminescent portions 282 and 284 may be thermo-formed, inserted, and/or deposited on the interior surface 318 to form the first graphic 286 in the first color 290 and the second graphic in the second color 292.

The light absorbing or reflective layer 322 may be disposed on the exterior surface 320 to ensure that the photoluminescent material of the photoluminescent portions (e.g. 282 and/or 284) is not excited by external light sources. In some embodiments, the light absorbing layer 322 may be dispersed in the material of the cover portion 312 or disposed on the interior surface 318 between the photoluminescent portions 282 and 284, such that external light sources are prevented from exciting the photoluminescent portions 282 and 284. Some examples of optical coatings and dispersions that may be utilized for the light reflecting layer may include absorptive, dichroic, and/or a variety of other light reflective coatings and/or filters. In some embodiments, the light absorbing or reflective layer 322 may correspond to a vacuum metalized layer applied to the exterior surface 320. In such embodiments, the metallized coating may serve to provide a metallic and/or chrome appearance to the trim portion 252 while reflecting excitation wavelengths (e.g. the first wavelength) such that the photoluminescent portion 254 remains dormant in response to the light source 256 being active.

In some embodiments, the first photoluminescent portion 282 and the second photoluminescent portion 284 may be configured similar to the first photoluminescent portion 24 and the second photoluminescent portion 30. For example, the at least one light source 256 may comprise a first light source 332 and a second light source 334. The first light source 332 may be configured to emit the first emission 16 such that the first photoluminescent portion 282 becomes excited. In response to receiving the first emission, the first photoluminescent portion 282 may convert the first emission 16 to a second emission 20 having a second wavelength. The second light source 334 may be configured to emit the third emission 28 having the third wavelength. In response to receiving the third emission 28, the second photoluminescent portion 284 may become excited and emit the fourth emission 32 having the fourth wavelength.

Each of the photoluminescent portions 282 and 284 may be configured to have the first absorption range 90 and the second absorption range 92 as discussed in reference to FIG. 5. In general, the first absorption range 90 and the second absorption range 92 may correspond to substantially different ranges or partially overlapping ranges of wavelengths of light emitted from the first light source 332 and the second light source 334. In the example wherein the first and second absorption ranges correspond to substantially different wavelengths of light, the first photoluminescent portion 282 and the second photoluminescent portion 284 may be excited independently by their respective light sources 332 and 334. In the example wherein the first absorption range and the second absorption range are partially overlapping, the first photoluminescent portion 282 and the second photoluminescent portion 284 may be excited partially by each of the light sources 22 and 26 to vary the intensity and generate a blending effect of the first graphic 286 and the second graphic 288. In this way the disclosure provides for a lighting system 250 operable to selectively illuminate the first photoluminescent portion 282 and the second photoluminescent portion 284 to generate a variety of lighting patterns, blending, and various other lighting effects as discussed herein.

The control circuit 306 may comprise one or more circuits and/or processors operable to control the light sources 332 and 334 in response to receiving signals from the vehicle controller 304. The signals from the vehicle controller 304 may be configured to identify a state of the vehicle 182. For example, the control circuit 306 may be operable to control an intensity or illumination level of the light sources 332 and 334 in response to an ambient light condition, a presence detection, or any form of sensory interface. The control circuit 306 may also selectively activate the light sources 332 and 334 in response to an ignition event, a locking, unlocking actuation, a gear selection, emergency brake actuation, vehicle speed, braking, turn signal, etc. In some embodiments, the lighting system 250 may also be configured to selectively illuminate the light sources 332 and 334 in response to a presence or proximity detection of a vehicle key or key fob, and/or a signal from a remote keyless entry device. In this way, the lighting system 250 may provide for safe operation of the lighting apparatus 300 corresponding to a plurality of vehicle operating states and various controls intended to ensure that the operation of the lighting system 250 conforms to lighting requirements and restrictions on roadways.

The disclosure provides for a lighting system 250 configured to output light from at least one photoluminescent portion of a lighting apparatus. In some embodiments, the photoluminescent portion may reveal at least one graphic on a surface of a vehicle. The various embodiments provide for a plurality of photoluminescent materials that may be selectively activated to generate various lighting effects in response to the activation of a plurality of light sources. The system 250 provides various benefits including generating visual effects to improve an appearance of a vehicle, increase value, and provides various safety benefits by improving visibility.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illumination apparatus for a vehicle comprising:
a trim portion affixed to a surface comprising a first photoluminescent portion; and
at least one light source configured to emit a first emission at a first wavelength to excite the first photoluminescent portion in a back lit configuration, wherein the trim portion is configured to mask the first photoluminescent portion from external light sources.

2. The illumination apparatus according to claim 1, wherein the trim portion is configured to mask the first photoluminescent portion such that the first photoluminescent portion is substantially visible in response to the at least one light source emitting the first emission.

3. The illumination apparatus according to claim 1, wherein the light source comprises an array edge-lit light source configured to emit light through the trim portion along the surface of the vehicle.

4. The illumination apparatus according to claim 1, wherein the trim portion comprises a cover portion and is configured to affix the light source to the surface in a sealed housing.

5. The illumination apparatus according to claim 1, wherein the trim portion is configured to substantially limit light at the first wavelength transmitted to the first photoluminescent portion from external light sources corresponding to the first wavelength.

6. The illumination apparatus according to claim 1, wherein the illumination apparatus is configured to selectively reveal a hidden graphic in response to the at least one light source emitting the first emission.

7. The illumination apparatus according to claim 6, wherein the hidden graphic corresponds to a second photoluminescent portion.

8. The illumination apparatus according to claim 7, wherein the first photoluminescent portion and the second photoluminescent portion are disposed proximate an interior surface of the cover portion.

9. A lighting system for a vehicle comprising:
at least one light source in communication with a control circuit; and
a trim portion affixed to a surface comprising a first photoluminescent portion and a cover portion configured to house the light source, wherein the control circuit is configured to selectively activate the light source to emit a first emission to excite the first photoluminescent portion in a back lit configuration to reveal a graphic.

10. The lighting system according to claim 9, wherein the trim portion is configured to mask the first photoluminescent portion from light originating from external light sources.

11. The lighting system according to claim 9, wherein the trim portion is composed of an at least partially light transmissive material and is configured to limit a transmission of wavelengths of light approximately less than 500 nm through the partially light transmissive portion.

12. The lighting system according to claim 9, wherein the at least one light source comprises an edge-lit light source configured to emit light through the trim portion along the surface of the vehicle.

13. The lighting system according to claim 9, wherein the first photoluminescent portion is thermo-formed to an interior surface of the trim portion.

14. The lighting system according to claim 9, further comprising a second photoluminescent portion corresponding to the graphic.

15. The lighting apparatus according to claim 14, wherein the first photoluminescent portion and the second photoluminescent portion comprise photoluminescent materials configured to emit luminance in a first color and a second color respectively in response to receiving the first emission.

16. A lighting apparatus for a vehicle comprising:
at least one light source; and
a trim portion affixed to a surface comprising a first photoluminescent portion, a second photoluminescent portion, and a cover portion configured to house the light source, wherein the light source is configured to selectively emit a first emission to excite at least one of the first photoluminescent portion and the second photoluminescent portion.

17. The lighting apparatus according to claim 16, wherein the at least one light source comprises a first light source configured to emit the first emission and a second light source configured to emit a second emission.

18. The lighting apparatus according to claim 17, wherein the first emission corresponds to a first wavelength and the second emission corresponds to a second wavelength different from the first wavelength.

19. The lighting apparatus according to claim 18, wherein the first light source is configured to excite the first photoluminescent portion to illuminate a first graphic in a first color.

20. The lighting apparatus according to claim 19, wherein the second light source is configured to excite the second photoluminescent portion to illuminate a second graphic in a second color.

\* \* \* \* \*

UNITED STATES PATENT AND TRADEMARK OFFICE
CERTIFICATE OF CORRECTION

PATENT NO. : 9,434,297 B2  Page 1 of 1
APPLICATION NO. : 14/525370
DATED : September 6, 2016
INVENTOR(S) : Salter et al.

It is certified that error appears in the above-identified patent and that said Letters Patent is hereby corrected as shown below:

Column 21, Claim 1, Line 46:
After "wavelength" insert --configured--.

Signed and Sealed this
Ninth Day of May, 2017

Michelle K. Lee
*Director of the United States Patent and Trademark Office*